(12) United States Patent
Nieminski et al.

(10) Patent No.: US 7,036,870 B2
(45) Date of Patent: May 2, 2006

(54) MODULAR BUS BODY ASSEMBLY

(75) Inventors: Brant R. Nieminski, Burnsville, MN (US); Stephen P. Dudra, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/124,596

(22) Filed: May 9, 2005

(65) Prior Publication Data

US 2005/0212330 A1    Sep. 29, 2005

Related U.S. Application Data

(62) Division of application No. 10/764,372, filed on Jan. 23, 2004, now abandoned.

(51) Int. Cl.
*B60J 1/00* (2006.01)

(52) U.S. Cl. .................. 296/178; 296/193.04
(58) Field of Classification Search ........... 296/178, 296/193.04, 193.01, 193.03, 181.1; 29/469, 29/401.1, 897.2
See application file for complete search history.

(56) References Cited

U.S. PATENT DOCUMENTS

| | | | | |
|---|---|---|---|---|
| 1,991,535 | A | * | 2/1935 | Austin .................. 296/178 |
| 2,039,215 | A | * | 4/1936 | Fageol ................... 296/178 |
| 2,097,113 | A | * | 10/1937 | Bradley ................. 29/897.2 |
| 2,502,320 | A | * | 3/1950 | Guernsey ............... 296/178 |
| 2,606,058 | A | * | 9/1952 | Chasson ................ 296/178 |
| 3,794,374 | A | * | 2/1974 | Manning ............ 296/193.04 |
| 4,033,033 | A | * | 7/1977 | Heffner ................... 29/469 |
| 4,254,987 | A | * | 3/1981 | Leonardis .............. 296/178 |
| 4,274,190 | A | * | 6/1981 | Slattery ................. 296/178 |
| 4,283,086 | A | * | 8/1981 | Morin ................... 296/178 |
| 4,353,313 | A | * | 10/1982 | Panagin ................ 296/178 |
| 4,469,369 | A | * | 9/1984 | Belik et al. ............ 296/178 |
| 5,458,066 | A | * | 10/1995 | Ishida et al. ........... 105/401 |
| 5,669,307 | A | * | 9/1997 | Cichy ................... 296/178 |
| 5,669,999 | A | * | 9/1997 | Anderegg et al. ..... 156/173 |
| 5,690,378 | A | * | 11/1997 | Romesburg .......... 296/181.3 |
| 5,797,646 | A | * | 8/1998 | Jeunehomme et al. ... 296/178 |
| 6,227,125 | B1 | * | 5/2001 | Schroeder et al. ... 296/193.04 |
| 6,237,989 | B1 | * | 5/2001 | Ammerlaan et al. ..... 296/178 |
| 6,273,497 | B1 | * | 8/2001 | Devallez et al. ........ 296/178 |
| 6,454,345 | B1 | * | 9/2002 | Campus ................ 296/178 |
| D465,177 | S | * | 11/2002 | Daurelle et al. ......... D12/84 |
| 6,772,851 | B1 | * | 8/2004 | Dill ...................... 296/178 |
| 6,793,269 | B1 | * | 9/2004 | Pugh et al. ............ 296/178 |
| D502,892 | S | * | 3/2005 | Miernik ................ D12/100 |

* cited by examiner

*Primary Examiner*—Kiran B. Patel
(74) *Attorney, Agent, or Firm*—Jeffrey P. Calfa; Dennis Kelly Sullivan; Susan L. Lukasik

(57) ABSTRACT

A bus body is constructed from a combination of standard body modules selected from a plurality of standard types of modules. The standard body modules generally fit in more than one location longitudinally along the vehicle chassis.

5 Claims, 10 Drawing Sheets

END CAP ASSY 14

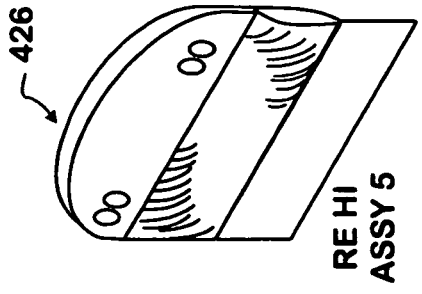
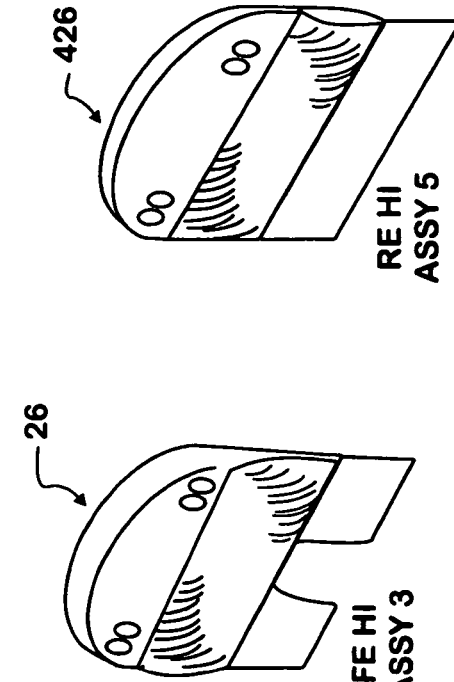
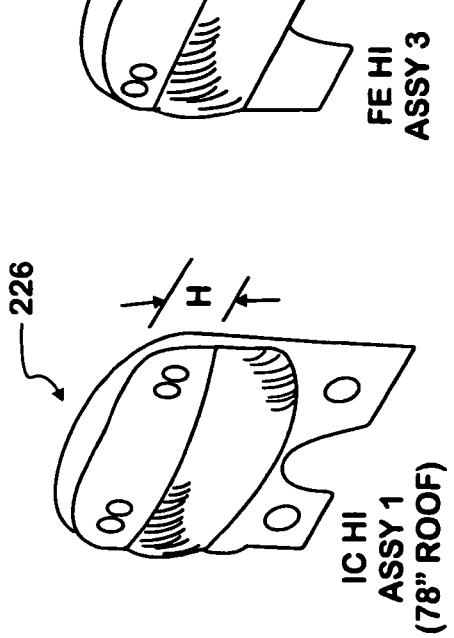
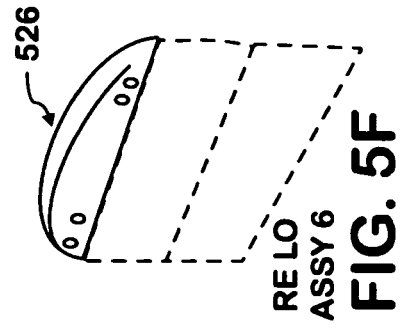
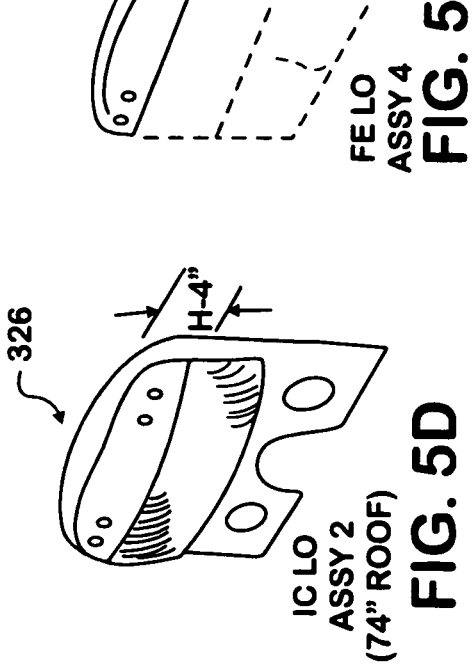

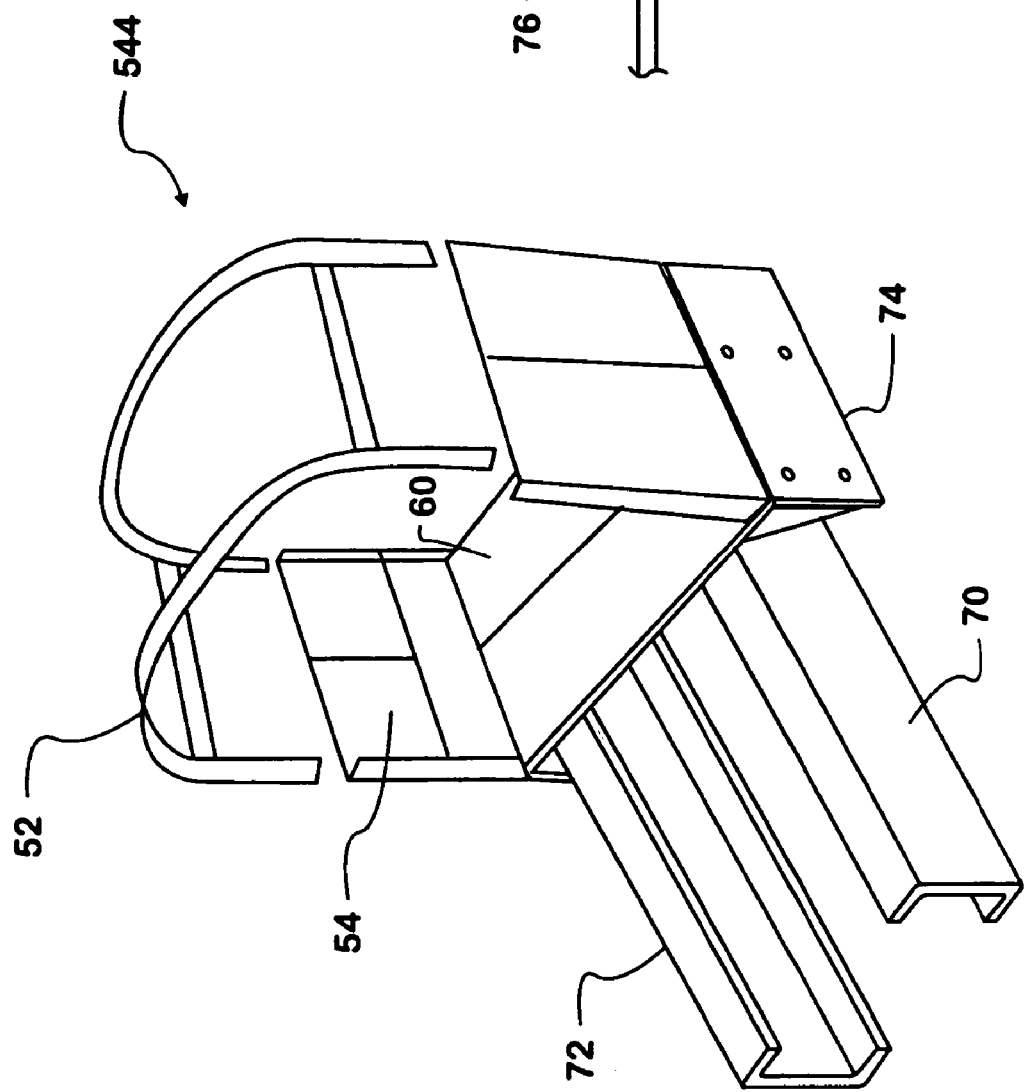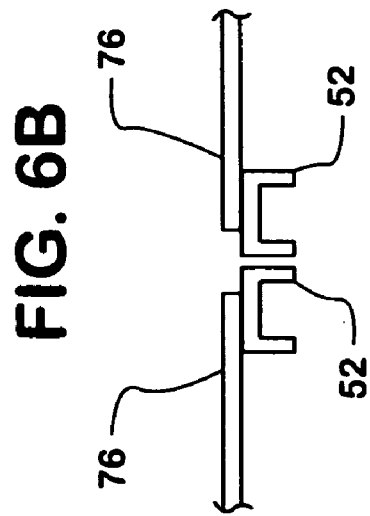

MODULAR BUS BODY ASSEMBLY

This is a division of application Ser. No. 10/764,372, filed Jan. 23, 2004 now abandoned.

BACKGROUND OF THE INVENTION

1. Technical Field

The invention relates to motor vehicle body assembly and more particularly to a system and method of bus body assembly allowing differentiation in configuration using standard body sections.

2. Description of the Problem

Operators of coaches and busses, particularly school busses, often demand specialized body configurations in terms of the location for exit locations and types, body length, engine location (e.g. front engine, rear engine and conventional) and roof height. The current practice for bus construction provides for assembly of a body frame on top of a chassis and then applying a skin over the body frame. This process requires first building a floor structure as a foundation. Then roof bows, stringers and drip rails are raised on the floor assembly to make the body's skeleton. Next, outer and inner sheet metal panels are applied to the skeleton enclosing the body. Building vehicles in this manner to meet differing customer requirements has demanded custom layout, specification of and cutting body elements to fit the custom requirements. All of this variation minimizes the opportunity for use of repetitive construction techniques and makes automation of assembly difficult.

Automated assembly is made easier by application of a modular manufacturing strategy. Modular manufacturing strategies typically deconstruct a product line (including variations) into discrete sub-assemblies (modules), usually located with some degree of arbitrariness. When the modules are combined in various numbers and arrangements multiple product configurations are possible. This type of sub-assembly typically does not exhibit what is termed "functional cohesion". An example of a sub-assembly module for a motor vehicle is the vehicle engine. An engine is part of a vehicle drive train and is regarded as a standard module in automotive and truck design. It is not a functionally cohesive module, however, because it cannot perform its intended function without a compatible cooling system, fuel system and transmission. When the engine is changed all of the associated drive train sub-assemblies are subject to change to accommodate the change of engine. A functionally cohesive module tolerates changes in other modules but still performs its function.

Where and how demarcations are made in defining sub-assembly units can control how functionally cohesive a sub-assembly is. A bus body may be divided into various kinds of sub-assemblies and remain "modular". For example, a possible modular bus body might have floor, front end, side, rear end and roof modules. To accommodate customer requests for busses of different lengths the side, roof and floor modules would have to provided in different lengths. The sub-assemblies would lack cohesion. As a consequence, synchronization would be required in delivery of the parts for assembly, adding complexity to the manufacturing process.

SUMMARY OF THE INVENTION

According to the invention there is provided a bus body comprising a combination of longitudinal body sections. The longitudinal body sections are provided in a plurality of types from which the combination is drawn. A combination may include some or all of the types of body sections, and may include more than one example of a particular type of longitudinal body section. The types of longitudinal body sections include a section type adapted to fit on a chassis over a group of wheels, a section type including an auxiliary side door, a section type including a passenger boarding well and a section type having parallel fixed side walls. The section type having parallel fixed side walls is provided in at least two standard lengths. The types of longitudinal body sections are also provided in first and second predetermined heights. End caps and forward assemblies for closing the opposite longitudinal ends of the bus body are also provided.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A through 5F are perspective views of each of a set of front end assemblies for a school bus body.

FIG. 6A is a perspective view of the mounting of an intermediate, modular standardized body section on a bus chassis.

FIG. 6B is a cross sectional view of adjacent rib bows.

DETAILED DESCRIPTION OF THE INVENTION

Figure 1:
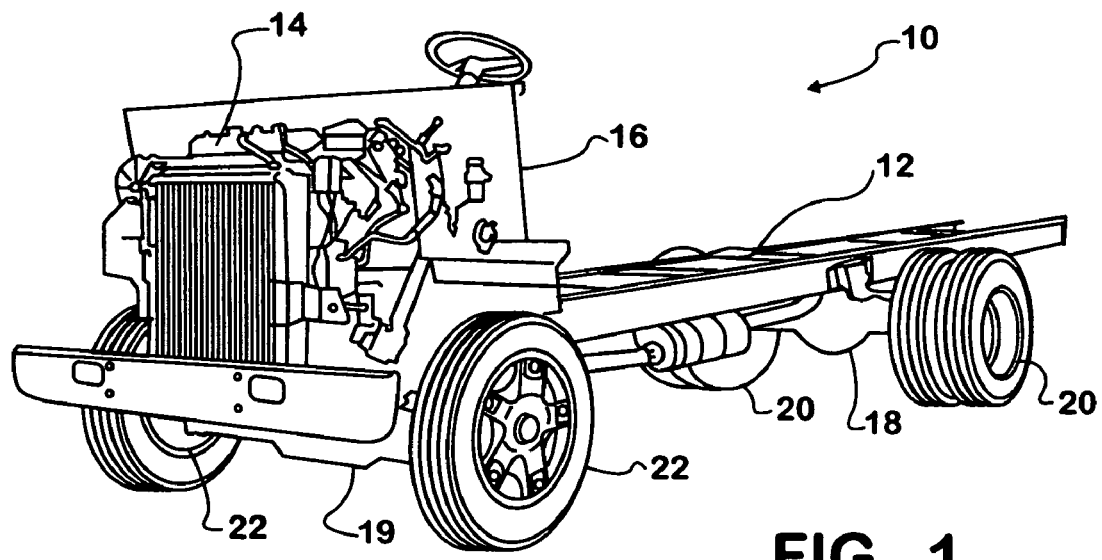
FIG. 1 is a perspective view of a chassis for a truck or bus.

Referring now to FIG. 1 a vehicle chassis 10 is illustrated. The foundational component of chassis 10 is a box frame 12. Box frame 12 provides connection points for suspension elements which position rear axle 18 and front axle 19. Rear wheels 20 and front wheels 22 are mounted on axles 18 and 19, respectively. Box frame 12 carries an engine 14 and dashpanel 16 and provides a base for the construction of a body in accordance with the invention as taught below. Vehicle chassis 10 is configured for a conventional bus, that is one with the engine 14 mounted forward of dashpanel 16 on the chassis and the body being built behind the dashpanel. However, the invention is equally applicable to rear engine and front engine busses. Front engine busses have a flush front end with the engine being mounted on the frame below the floor of the passenger cabin.

Figure 2:
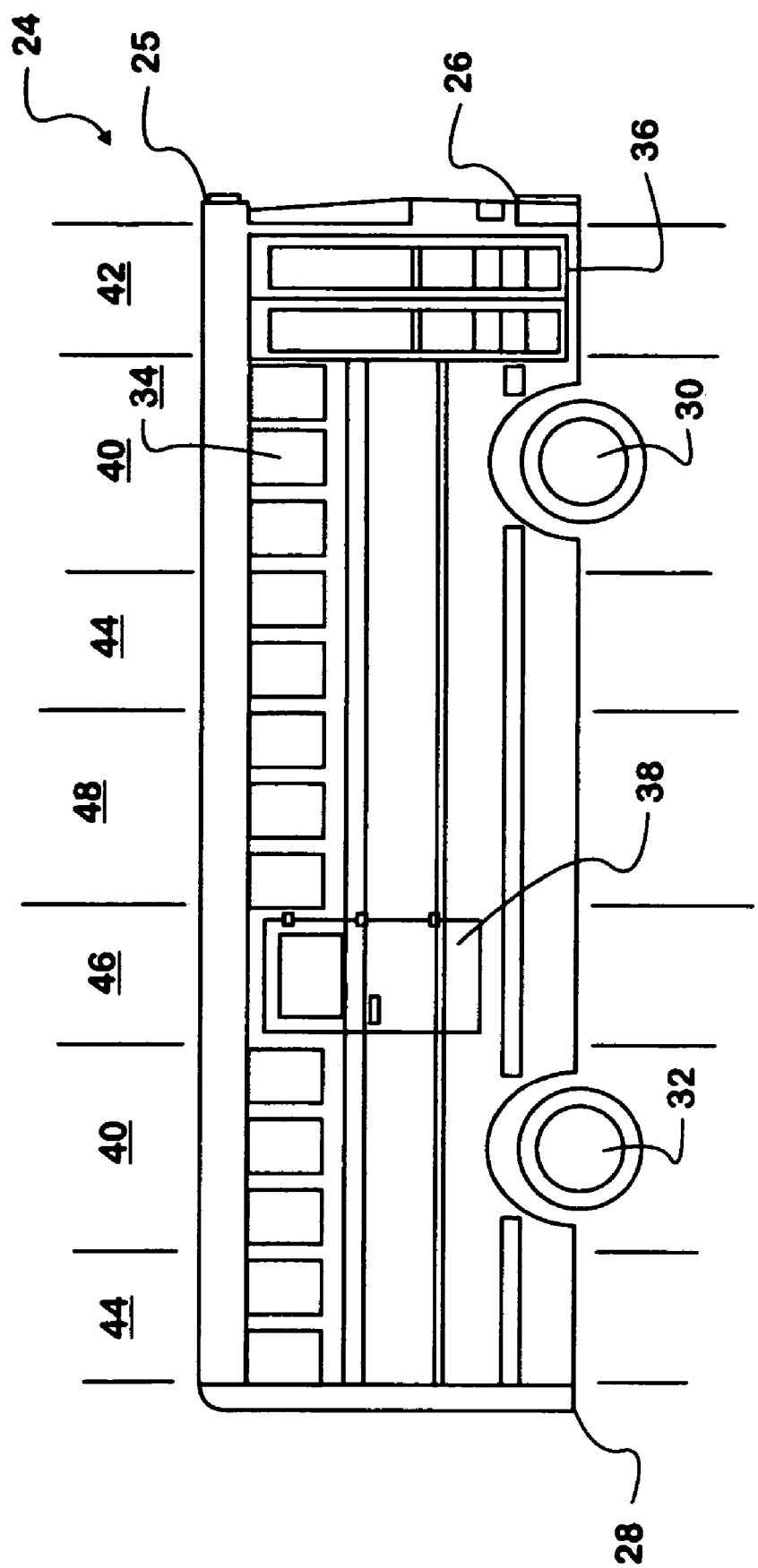
FIG. 2 is a side elevation of a front engine school bus.
Figure 3A:
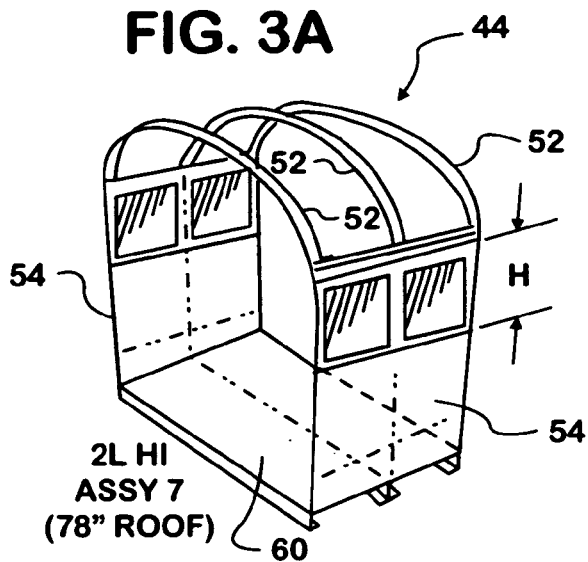
FIGS. 3A through 3G are perspective views of each of a set of longitudinally intermediate, modular, standardized body sections used for constructing a school bus body.
Figure 3B:
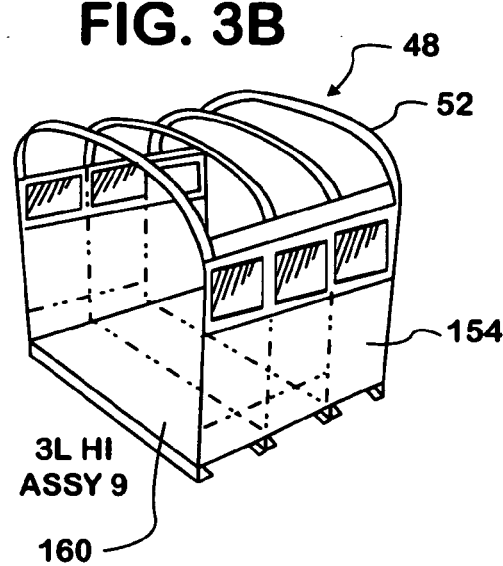
Figure 3C:
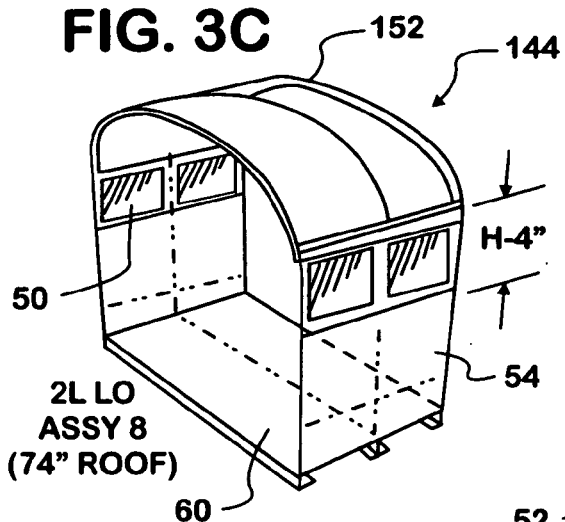
Figure 3D:
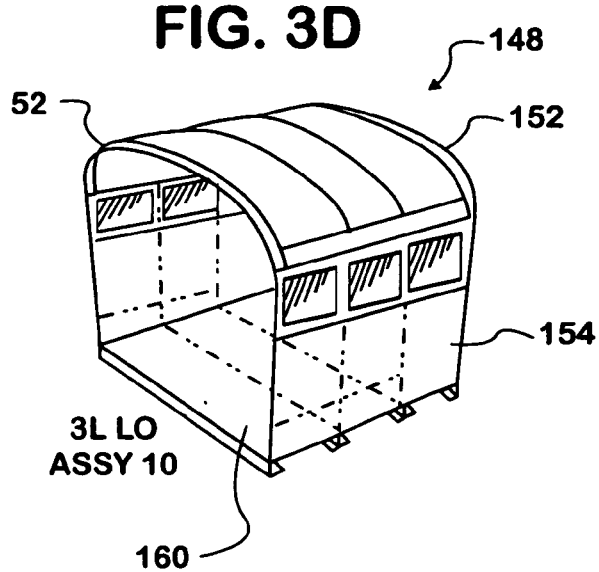
Figure 3E:
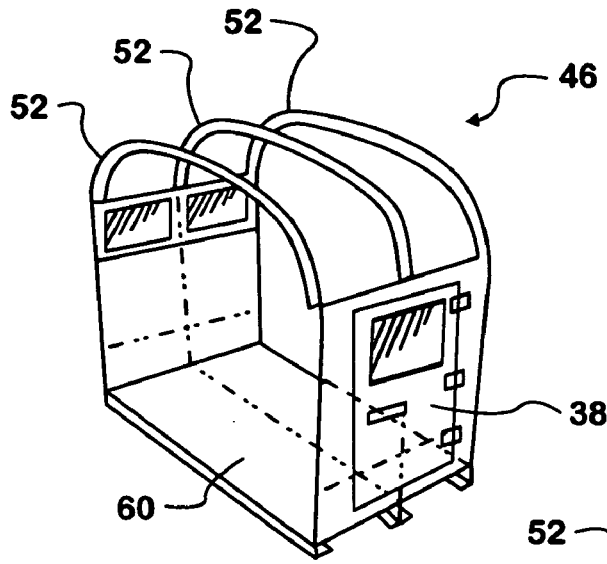
Figure 3F:
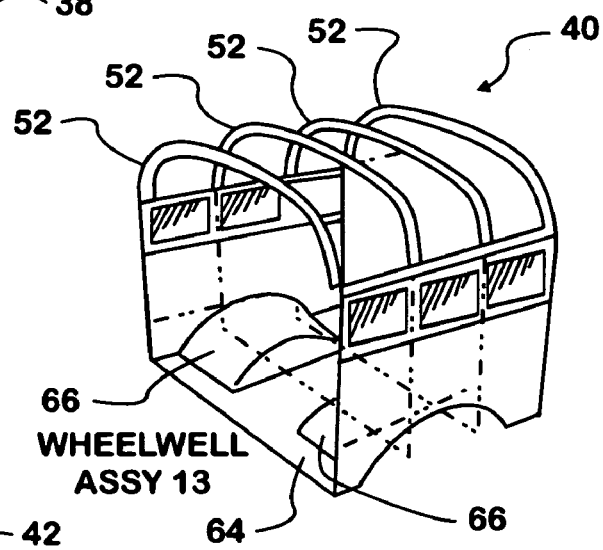
Figure 3G:
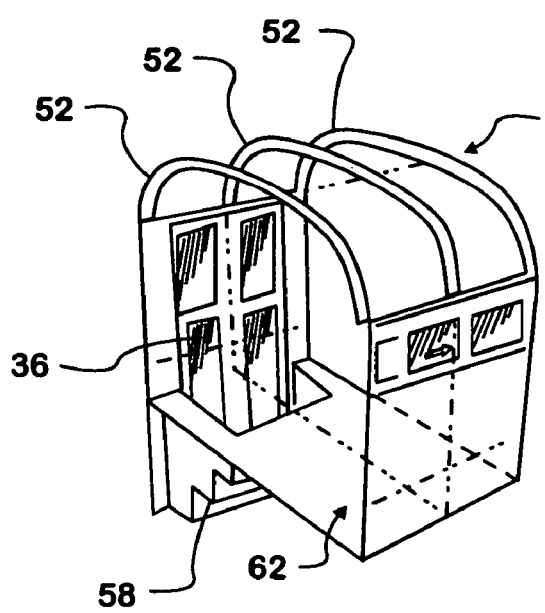

FIG. 2 illustrates in side elevation a front engine school bus 24. Front engine bus 24 incorporates an engine mounted to the vehicle chassis under the vehicle body floor at the vehicle's forward end. The bus body 25 rests on a chassis supported by front wheels 30 and rear wheels 32. The interior of body 25 is normally accessed by a passenger door 36 located toward the front of the vehicle, and may be accessed through auxiliary doors at the rear of the vehicle (not shown) or the side of the vehicle. An auxiliary door 38 is illustrated in the side of front engine bus 24. Exclusive of the passenger door 36 and the auxiliary door 38, the length of body 25 along both sides of the vehicle, is lined by standard sized windows 34 toward the top of the passenger cabin.

Body 25 is illustrated as comprising a plurality of section modules 40, 42, 44, 46, and 48 which are arrayed lengthwise on the bus chassis. Modules 40 and 44 are repeated at different locations. The modules 40, 42, 44, 46, and 48 incorporate body elements, which are repeated from vehicle to vehicle, but which are not always located at the same longitudinal position on the bus, such as the passenger door 36 or a side auxiliary door 38. In body 25 passenger door 36 is incorporated in a longitudinal body module 42 positioned at the front end of bus body 25. In a front engine bus 24 the passenger cabin is disposed over both sets of wheels, namely front wheels 30 and rear wheels 32. Identical over wheel modules 40 may be used at each location, each module being long enough to incorporate three side windows 34 on each side. Three sections comprising uninterrupted side walls and windows 34 are designated as modules 44, 48. Two sections are provided by modules 44, one immediately behind front wheels 30 and the second behind rear wheels 32. A module 44 has two windows 34 to a side, and module 48, located between the forward module 44 and the auxiliary door module 46, is half again as long as one of modules 44 and has three windows 34 to a side.

The illustrated arrangement or combination of modules for bus 24 in FIG. 2 is by no means the only one possible. Auxiliary door module 46 and passenger door module 42 are both the same length from front to back as one of modules 44, and the positions of these modules are very flexible. For example, passenger door module 42 can be placed at the back of the bus and the iteration of module 44 located there moved to the front of the bus in place of the passenger door module 42. The modules 44, 46 and 48 located between front wheels 30 and rear wheels 32 can be rearranged as desired. Only the over wheel modules 40 are practically limited to locations centered over the axes of rotation of the front and rear wheels. However, for conventional busses only one over wheel module, for the portion of the chassis over the rear wheels 32, is used. The number or combination of modules used is varied depending upon the chassis' length. All of modules 40, 42, 44, 46 and 48 may be prefabricated in batches and the combination used for a particular bus selected from pools of modules.

Bus body 25 is closed at opposite longitudinal ends by a front end section 26 and an end cap 28. Front ends and end caps are also interchangeable parts with other busses of the same type and height.

Referring now to FIGS. 3A–G, individual module types are illustrated. Individual types of body section modules include certain generic features, e.g. frames 50 for windows 34 and roof bows 52. Five basic types of body section modules are provided, with each type coming in one of two heights. The body section modules may have either a 78" high roof or a 74" high roof. The difference occurs in height differences between windows as exemplified between a body section module type 44 which has a window height of H, and body section module type 144, which has a window frame 50 height of H-4. Modules typically come in one of two lengths, determined by the number of roof bows 52 they have. The spacing between roof bows 52 determines the standard lengths for the various types of longitudinally intermediate body modules. Bows 52 are spaced by 27" and a module includes either three bows 52 or four bows so that the length of a module is about 2 bow gaps (about 54") or three bow gaps (about 81"), although other gap lengths are possible. Some of the modules are illustrated with exposed roof bows 252, while other sub-assemblies are completed with roof 152.

The five basic types of body section modules include a short main body or short seating bay module 44 of two bow 52 gaps, characterized by side walls 54 which are uninterrupted from front to back. Similar to short main body module 44 is long main body or long seating bay module 48 which has four bows 52 for a length of three bow gaps and uninterrupted main side walls 154. A floor 60 forms the bottom of short main body section module 44 and a longer floor 160 provides the base for long main body module section 48. The three remaining body section modules serve more specialized functions, or, in the case of an over wheel body section module 40, are adapted to fit at particular points of the chassis. Over wheel body module 40 includes four roof bows 52 giving the unit approximately a three gap length. Over wheel body modules 40 are limited to positions over a vehicle's wheels, which means two modules are used for rear and front engine buses and one module is used over the rear wheels on busses with conventionally located engines. Over wheel body module 40 incorporates a floor 64 having wheel wells 66 on opposite sides of the module. Two sections relate to ingress and egress from a bus including a passenger door body module section 42, which includes a door well 58 in the floor 62 and a full height passenger door 36, allowing easy access from street level, and an auxiliary door body module 46, which incorporates a partial height door 38 with a lower edge substantially level with floor 60 of the module. The specialized modules come in one of two body heights, however, only one height is shown for the specialized section modules.

In addition to the body section modules, which are placed intermediate the front and rear ends of a bus, there are also end cap assemblies 28 and front end assemblies. These components are preexisting modules and come in one basic type (in two heights) for the rear end of the vehicle, shown in FIG. 4 and as three types (again in two heights) for the front of the vehicle. These include, high roof and low roof conventional front ends 226 and 326, high and low roof front engine assemblies 26 and 126 and high and low roof rear engine front end assemblies 426 and 526, shown in FIGS. 5A–5F.

Figure 4:
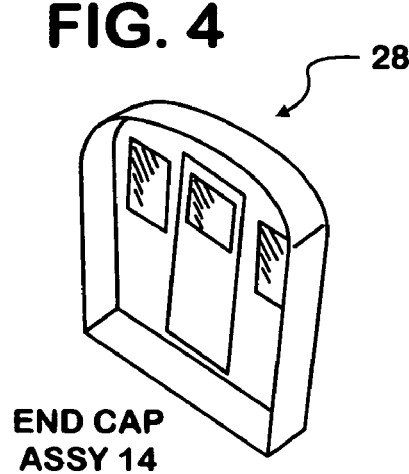
FIG. 4 is a perspective view of an end cap for a school bus body.

The several body section modules illustrated in FIGS. 3, 4 and 5 exhibit a high degree of functional cohesion. A standard body section of FIGS. 3A–D provides a bay for occupant seating, the module of FIG. 3E provides an exit door and exit aisle and all of the modules may be applied to busses of virtually any practical length. Modules function for their intended purpose regardless of its adjacent module, so that a plurality of modules are required for a complete bus, positioning of one module in a particular position does not entail positioning of a specialized module adjacent to it. Changes to adjacent modules does not effect the functionality of a module. This in turn allows for producing a wide variety of bus-body configurations with only a handful of functionally cohesive modules. Bus body configuration may be specified by the selection of modules and assembly these modules do not have to be sequentially line set. The present invention allows the asynchronous manufacture of bus body modules that can than be buffered (i.e. stored) until demanded on the assembly line.

FIG. 6A illustrates positioning of a representative intermediate body section module, here a partial main body section module 544, on left side and right side frame rails 70 and 72 of a vehicle chassis. Floor 60 is attached to frame rails 70 and 72 by fasteners or spot welding. Body module 544 rests latitudinally centered over frame rails 70, 72, with floor 60 overlapping the rails to both sides. A side skirt 74 extending below the side walls 54 of the main body of body module 544 thereby hiding frame rail 70 from view from the side. Side skirt 74 is preferably provided as an integral part of the module.

FIG. 6B is a cross section taken along a pair of adjacent roof bows 52, brought into proximity to one another when two intermediate section modules are positioned next to one another. Roof bows 52 are C-channels, with the channel face turned downwardly to provide a smooth upper surface for the positioning of roof sections 76. As illustrated, modules are assembled with roof bows 52 exposed and a roof applied after the rest of the external body is constructed. Alternatively, the modules can be sub-assembled with a roof skin. Where this is done, a standard module incorporating a roof hatch may be provided, perhaps included in one of the straight wall modules.

Figure 7:
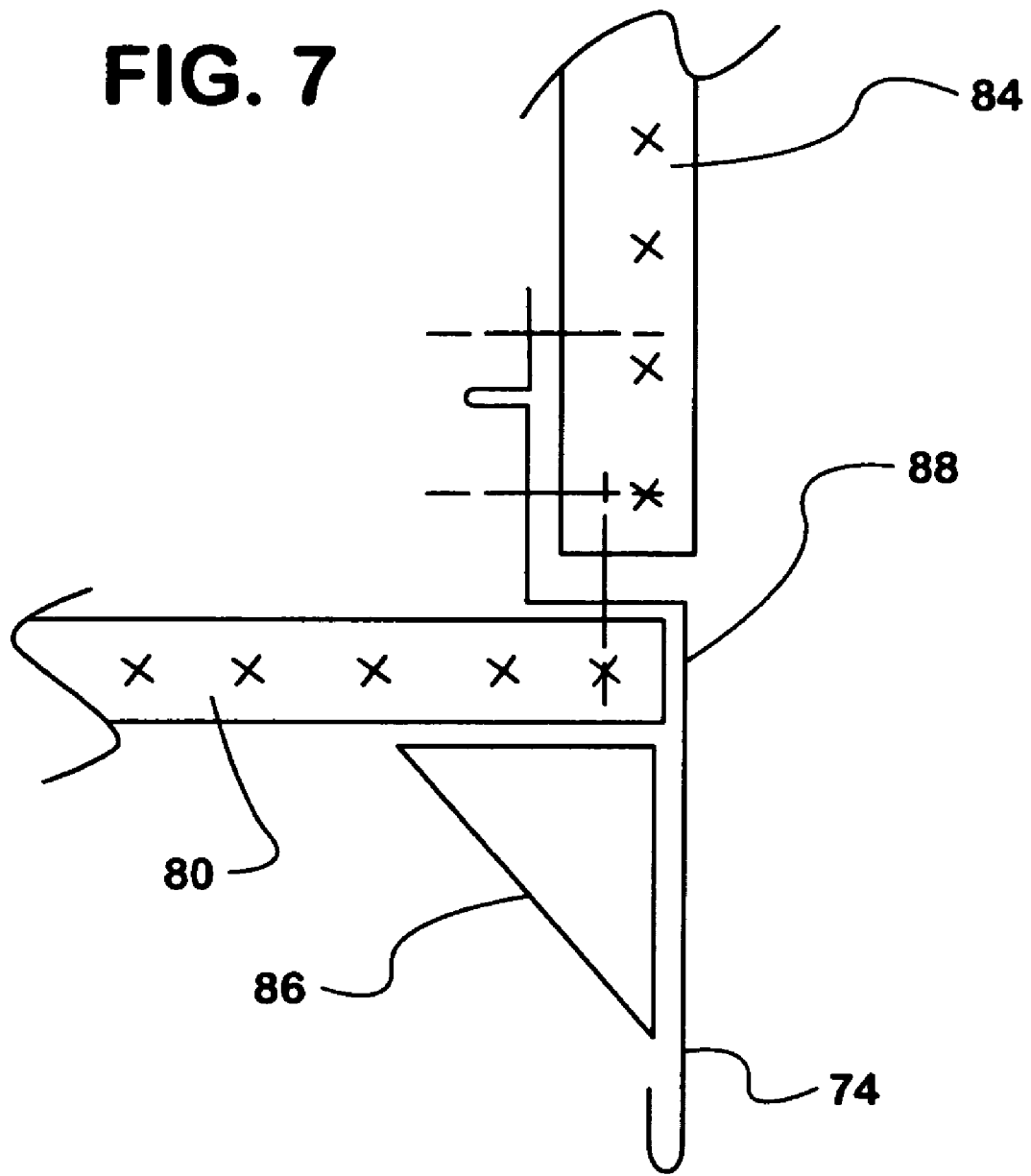
FIG. 7 is a cross sectional view illustrating floor to body side mating of the intermediate, modular, standardized sections.

Referring to FIG. 7 possible construction details of an intermediate body module, viewed in cross section at the base of the juncture between wall and floor, are shown. The detail joint designs are illustrative only and numerous other types of joints are possible. A floor panel 80 provides a foundation, along an edge of which is disposed a seat rail with integral side skirt 88. Seat rail 88 has an inside, upward oriented flange against which is nestled the base of a side wall section (roll form shape) 84, an intermediate, horizontal section which rests on the floor, and an outside, downward oriented flange which provides a skirt 74. Skirt 74 extends well below the level of floor section (roll form shape) 80 and accordingly is braced by gussets 86, one of which is shown to be fitted between the underside of the floor section 80 and skirt 74. Floor section 80 are preferably spot welded to seat rail 88. Side wall/body side 84 is preferably attached to rail 88 by blind rivets, weld nuts, or studs. Gusset 86 is preferably spot welded to floor section 80 and skirt 74 of rail 88.

Figure 11:
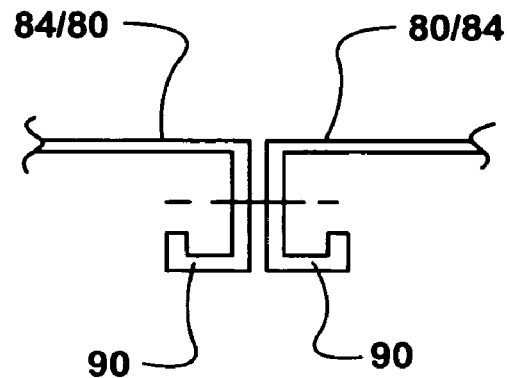
FIG. 11 is detailed view of a joint between two floor or wall panel segments.
Figure 8:
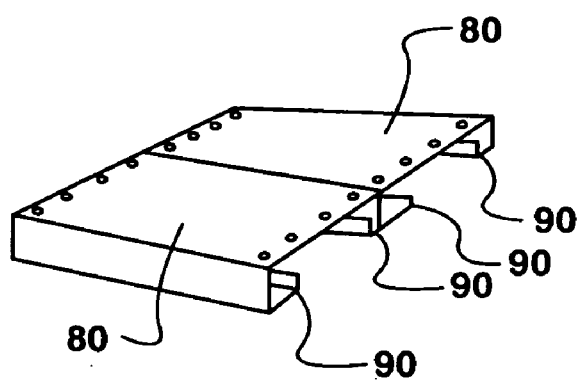
FIG. 8 is a perspective view illustrating construction of floors of sections.
Figure 9:
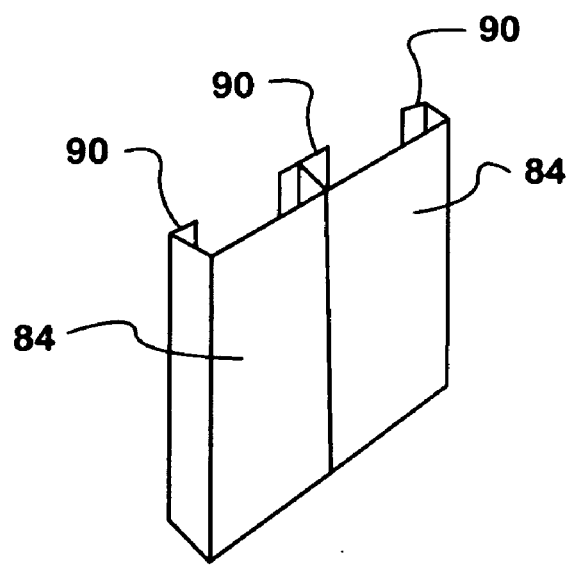
FIG. 9 is a perspective view of construction of a body side.

FIGS. 8 and 9 depict assembly of intermediate module floors and side walls from roll form shaped panels 80/84, which are essentially identical to one another in shape, although not in dimensions, hole and attachment point patterns. Roll form shaped panels 80/84 are essentially flat, rectangular panels, with one pair of opposite edges turned under and inwardly to from C-channels 90 along a pair of edges of the panels. The outside face of C-channels 90 perpendicular to the principal plane of the panels are brought adjacent one another as illustrated in FIG. 11 and joints are formed by spot welding or self pierce riveting to adjacent C-channels 90 and to the frame rails 70 and 72. No bows are required for the body side walls or floor due to the strength provided by the cross sectional shape of the panels.

Figure 10A:
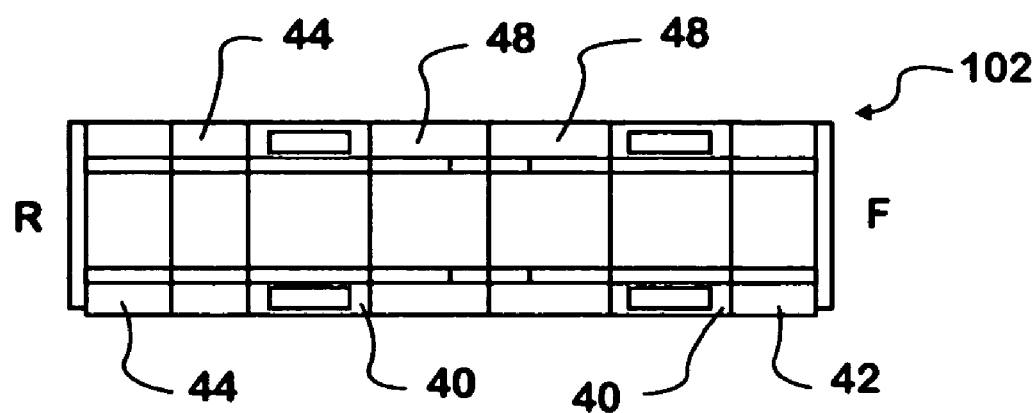
FIGS. 10A–B are bottom plan views of possible bus body configurations.
Figure 10B:
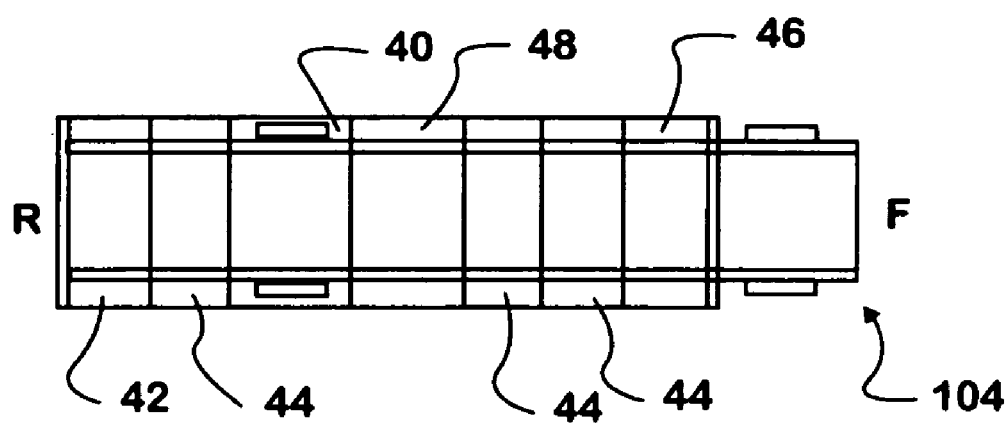

As described above, numerous combinations of intermediate section modules are possible. FIGS. 10A and B illustrate possible configurations for a rear engine bus 102 and a conventional bus 104, respectively. For both busses the front and rear are marked "F" and "R", respectively. For rear engine bus 102 the forward most intermediate section is a passenger door module 42. Moving to the rear module 42 is followed by the first of two over wheel sections 40, two successive long main body modules 48, the second over wheel module 40, and two short main body modules 44. Conventional bus 104 has, moving from front to rear an auxiliary door section 46, two successive short main body sections 44, a long main module 48, an overwheel module 40, another short main body section 44 and, at the rear of bus 102, a passenger door section 42.

Figure 12:
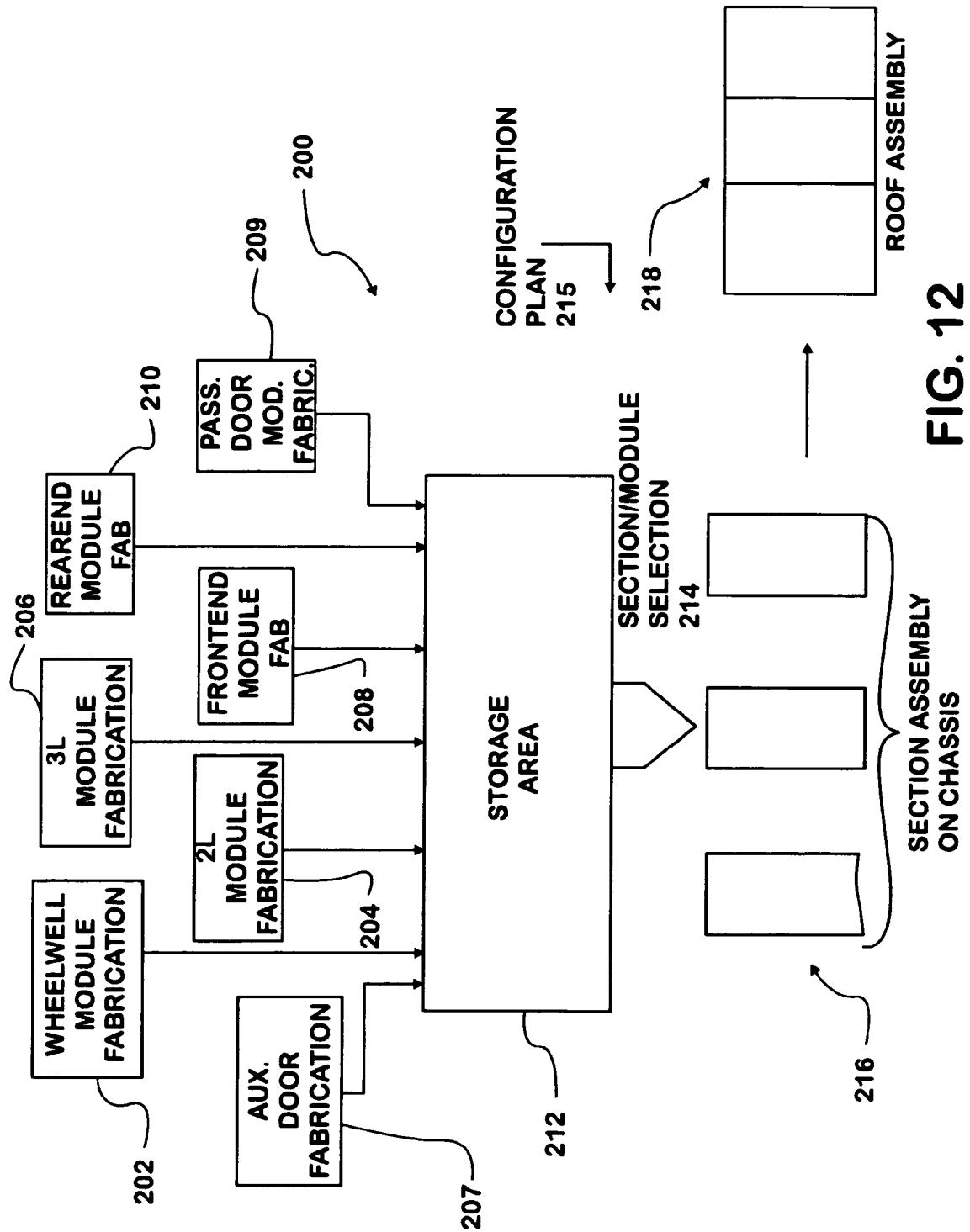
FIG. 12 is an illustration of manufacturing flow for assembling vehicles from modular sections.

FIG. 12 illustrates a manufacturing flow process 200 for assembly of a bus body utilizing body modules. Modules are assembled in fabrication cells dedicated to the particular module types. Historical data can be used to predict the number of each modules to make. The sub-assembly types can include a wheelwell module fabrication cell 202, a straight wall short length module fabrication cell 204, a straight wall long length module fabrication cell 206, a front end module fabrication cell 208, a rear end module fabrication module cell 210, an auxiliary door module fabrication cell 207 and a passenger door module fabrication cell 209. Modules are not typically dedicated to a particular bus and can be held until needed in a storage area 212. Once a plan 215 for a bus is received on the assembly floor, selection 214 of modules delivers modules to a bus body assembly area 216. From body assembly the bus body moves to a roof assembly area 218, if required.

The invention provides for configuring custom busses from a minimal number of standardized modules.

While the invention is shown in only one of its forms, it is not thus limited but is susceptible to various changes and modifications without departing from the spirit and scope of the invention.

What is claimed is:

1. A bus comprising:
    a chassis supported on front and rear wheels and including a box frame for supporting construction of a body; and
    a body constructed from a plurality of standardized body modules on the box frame, the standardized body modules being selected from a plurality of types of standardized body modules;
    the types of standardized body modules including an overwheel module type with the body including a first overwheel module positioned longitudinally along the chassis over the rear wheels, and, in a non-conventional bus, including a second overwheel module positioned longitudinally along the chassis over the front wheels; and
    the types of standardized body module types further including multipositional standardized body module types each of which are positionable at more than one longitudinal location along the chassis, excluding over wheel locations, in one or more iterations, the types of multipositional standardized body modules including, first and second seating bay module types with the first seating bay module type having half again the longitudinal length of the second seating bay module type,
    an auxiliary door module type, and
    a side well door module type;
    the body including one or more modules selected from the multipositional standardized body types; and
    a selected one from a set of standard front end closures including a first for conventionally configured busses, a second for rear engine busses and a third for front engine busses positioned to enclose the body at its front end.

2. A bus as set forth in claim 1, further comprising:
    a standardized end cap positioned to close a rear end of the bus body.

3. A bus as set forth in claim 2, the standardized body modules further comprising:
    forward and trailing edges turned inwardly to abut adjacent edges of one another when mounted end to end on the chassis.

4. A bus as set forth in claim 3, the standardized body modules further comprising flooring.

5. A bus as set forth in claim 4, the standardized body modules further comprising;
    framing for supporting a roof.

* * * * *